3,453,078
PROCESS OF PREPARING HIGH PURITY
CADMIUM HYDROXIDE
Hayden Monk and David Peter Pepworth, Avonmouth, England, assignors to Imperial Smelting Corporation (N.S.C.) Limited, London, England, a British company
Filed Jan. 6, 1967, Ser. No. 607,816
Claims priority, application Great Britain, Jan. 10, 1966, 1,106/66
Int. Cl. C01g 11/00, 1/10
U.S. Cl. 23—183     8 Claims

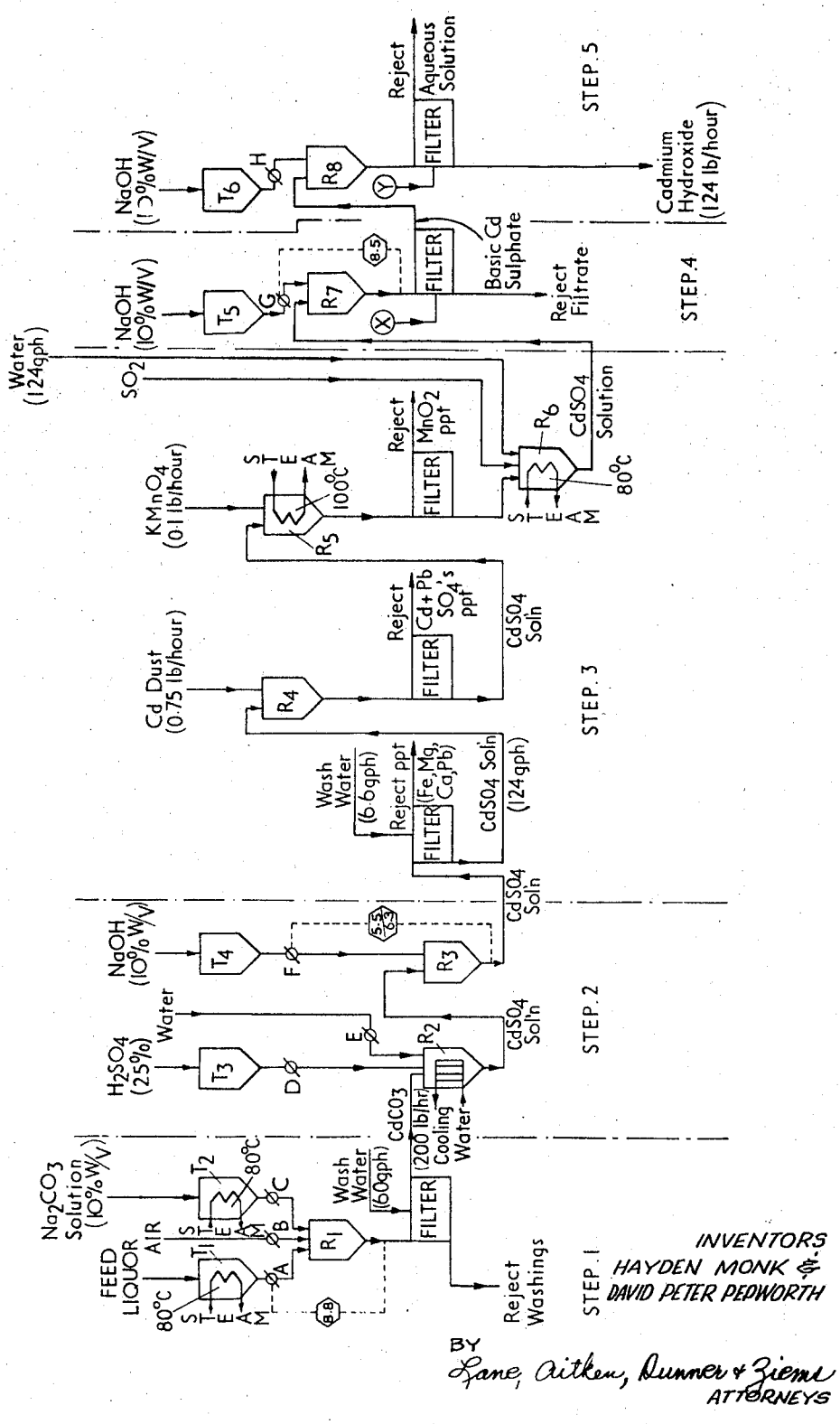

ABSTRACT OF THE DISCLOSURE

High-purity cadmium hydroxide is prepared from impure cadmium-bearing solutions of relatively low zinc content by precipitating the cations as carbonates, dissolving the carbonates in sulphuric acid, precipitating some impurities with hydroxide, treating the filtrate with cadmium dust, precipitating cadmium as the basic sulphate, and converting it to the hydroxide.

---

This invention relates to cadmium compounds.

High purity compounds of cadmium, e.g., the oxide, hydroxide, sulphide, etc., are in demand for use in the fields of plastic stabilizers, plasticizers, pigments and coloured compounds.

Up to date it has been difficult to provide a process for the preparation of cadmium compounds in a high state of purity since the metal is normally closely associated with such elements as zinc, lead and thallium in nature and is difficult to separate from such elements. However, in our copending British application No. 4,271/65, now British Patent 1,060,201, we have described a process by which cadmium ions are separated from zinc ions in chloride solution by liquid/liquid extraction so as to give cadmium chloride solution with a relatively low zinc content. However, such a chloride solution is still normally contaminated with small amounts of such cations as iron, lead, thallium calcium and magnesium, and sometimes also with traces of copper and manganese.

In one aspect the present invention consists in a process of preparing high-purity cadmium hydroxide (and hence the metal and other cadmium salts) from impure cadmium-bearing solutions of relatively low zinc content comprising the following steps:

(1) Treatment of the impure cadmium solution with an alkali-metal carbonate to precipitate the dissolved cations as carbonates.

(2) Treatment of the mixed carbonates from step (1), after filtration and washing, with sulphuric acid with subsequent addition of an alkali metal hydroxide to render the cadmium and magnesium soluble but to leave lead, calcium and iron substantially insoluble.

(3) Treatment of the sulphate solution from step (2) with cadmium dust, followed by filtration, to remove residual lead.

(4) Careful neutralisation of the cadmium sulphate solution with an alkali metal hydroxide to pH 7.5 to 9 to precipitate basic cadmium sulphate.

(5) Decomposition of the basic sulphate from step (4) with a solution of an alkali metal hydroxide to yield cadmium hydroxide which is then filtered off, washed and dried.

This combination of steps allows an extremely high-purity filterable cadmium hydroxide to be prepared and this is suitable for subsequent treatment, e.g., with high purity mineral acids to give other cadmium salts.

Step (1) is intended to separate the metal ions from chloride ions in solution and is preferably carried out in the presence of an oxidising agent, e.g., air in order to oxidise iron to the ferric state, so that it is precipitated as ferric hydroxide or carbonate. Precipitation is preferably carried out continuously at a pH of approximately 8.8. Alkali carbonate efficiencies of 65–75% (of theoretical based on the cadmium content of the solutions) are likely. The material precipitated in this way settles readily and is easy to wash with water on separation from its mother liquor, or, preferably, by the known counter-current methods: chloride contamination in subsequent stages is thereby reduced. This procedure also facilitates dewatering if required.

Steps (1), (3), (4) and (5) are preferably all carried out at a temperature within the range of 50–100° C.

Step (2)—Cadmium carbonate is added to sulphuric acid, or vice-versa. After the effervescence has ceased, the solution is kept acid enough to avoid cadmium precipitation, for example, at a pH of from 1.5 to 3.5 and is cooled to room temperature (about 25° C.). Cadmium loss of 2–3% can be expected in this stage, due to its occlusion, etc., in any insoluble matter. Sulphuric acid efficiencies, based on the cadmium content of the carbonate, are of the order 68–73%. This step is preferably finished at a pH of from 5.5 to 6.3. The presence of cobalt or nickel in the cadmium-containing solution requires the addition in this stage of one of the standard organic precipitants (e.g., dimethyl glyoxine for nickel and cobalt or oxine for cobalt alone—but there is a range available).

Step (3)—After treating the cold solution with cadmium dust (from 2 to 7, e.g., 4½ lb. dust per ton of cadmium sulphate from step (2), but depending on the amount of lead present) and separating off the insoluble basic sulphate, the temperature is raised to boiling. Potassium permanganate, either as solid or as an aqueous solution, is preferably added until the solution remains slightly pink. On further boiling a precipitate of manganese dioxide is obtained in a form which is readily separated. The clear solution is preferably cooled and treated with a little sulphur dioxide gas. This ensures a final product containing 50 p.p.m. lead, and less than 10 p.p.m. tellurium and manganese.

The purpose of step (4) is to separate cadmium from alkaline earth metals which are still soluble under the specified conditions of neutralisation. The cadmium sulphate and alkali hydroxide solutions are preferably reacted together continuously at pH 7.5 or 8–8.5 to obtain a precipitate both easy to wash free of trapped calcium, magnesium and sodium salts, and of a suitable form for dewatering easily. The amount of alkali hydroxide used is preferably 75–80% of the theoretical amount required by the cadmium content of the cadmium sulphate solution taken for this stage. Cadmium losses can be reduced to about 0.3%. For general ease of handing in this step, the cadmium sulphate solution should be 35–40 lb. $CdSO_4$ per 100 gallons of solution.

Overall efficiencies, in terms of cadmium recovery, of greater than 93% can be achieved. Typical impurity levels are as follows:

| | P.p.m. | | P.p.m. |
|---|---|---|---|
| Fe | 10 | Ca | 100 |
| Pb | 50 | Mg | 200 |
| Cu | 2 | Mn< | 10 |
| Zn | 90 | Phosphate< | 10 |
| Na< | 400 | Chloride< | 100 |
| $T_1$< | 10 | Sulphate | 100 | e.g., a total of about —05% impurities.

The cadmium solution after solvent extraction may contain some tributyl phosphate: it should therefore be washed with a suitable solvent (petroleum ether, kerosene, etc.) to remove it. If left in, tributylphosphate subsequently hydrolyses and interferes, by formation of a precipitate of magnesium phosphates, with the separation of magnesium in step (4).

Normally thallium is in solution in step (4) as thallous, but under some conditions, conversion to thallic in step (1) can occur during the air blowing. Thallic salts would then precipitate with the cadmium in step (4). This is prevented by the sulphur dioxide treatment mentioned as the last operation in step (3).

Following is a description by way of example of the invention, which description is designed to be read in conjunction with the accompanying flow diagram.

STAGE 1

The feed liquor, substantially free of tributyl phosphate and zinc and containing 0.1 lb./gal. of cadmium, expressed as the metal, is fed at a rate of 1000 gallons per hour into tank $T_1$, where it is steam heated to 80° C. Metering pump A passes the hot liquor into reactor $R_1$, where it is contacted with 200 cu. ft./min. of air, supplied by pump B, and 16.7 gallons per hour of sodium carbonate solution (1 lb./gal.), supplied through metering pump C, which has been steam heated in tank $T_2$ to 80° C. The addition of feed liquor to reactor $R_1$ are such as to maintain a pH of 8.8, and pump A is controlled by the pH meter to this and the resulting slurry is filtered, the precipitate washed with 60 gallons per hour of wash water, and filtrate and washings rejected.

STAGE 2

200 lbs./hr. of the cadmium-carbonate-containing precipitate are passed to reactor $R_2$, where 48.5 gallons per hour of 25% sulphuric acid, from tank $T_3$ via metering pump D, and 6 gallons per hour of water via metering pump E, are added to dissolve the precipitate and maintain a pH of 2.5. The solution is cooled to room temperature and passed to reactor $R_3$, where sodium hydroxide (1 lb./gal.) from tank $T_4$ via metering pump F, is carefully added to give a pH of from 5.5 to 6.3.

STAGE 3

The resulting liquor is filtered, and the precipitate containing chiefly lead, calcium and iron, is washed with 6.6 gallons per hour of wash water and rejected. The mixed filtrate and washings, containing 124 grams per litre of cadmium sulphate, is passed to reactor $R_4$, where it is mixed with 0.75 lb./hour of cadmium dust. The liquor is again filtered, the precipitate, containing chiefly cadmium and lead, is removed from further treatment, and the filtrate is passed to reactor $R_5$. Here potassium permanganate is added at the rate of 0.1 lb./hr., and the solution is boiled until the residual purple colouration is replaced by a brown precipitate of manganese dioxide, which is removed by filtration. The filtrate passes to reactor $R_6$, where it is heated to 80° C., and treated with 124 gallons per hour of water and sulphur dioxide.

STAGE 4

The cadmium-sulphate containing solution is passed to reactor $R_7$, where sodium hydroxide (1 lb./gal.) is added from tank $T_5$ via metering pump G to maintain a pH of 8.5 and to precipitate the cadmium without the alkaline earth metals. The liquor is filtered. The precipitate is washed with 10 gallons per hour of wash water, the filtrate and wash water being rejected.

STAGE 5

The washed precipitate is passed to reactor $R_8$ where it is further treated with 40 gallons per hour of sodium hydroxide (1 lb./gal.) from tank $T_6$ via metering pump H. The resulting slurry is again filtered, and the precipitate is washed with 600 gallons per hour of distilled water. The resulting precipitate consists of 124 lb./hr. of substantially pure cadmium hydroxide. (The filtrate and washings can be recycled to tank $T_5$ and made up to 10% again. A filter to remove sodium sulphate would then be required.)

We claim:
1. A process of preparing high-purity cadmium hydroxide from cadmium-bearing solutions containing dissolved therein a minor amount of zinc and at least one of the cations iron, lead, thallium, calcium, magnesium, copper or manganese as an impurity, comprising the following steps:
   (1) treating the impure cadmium solution with an alkali-metal carbonate to precipitate the dissolved cations as carbonates;
   (2) treating the mixed carbonates from step (1), after filtration and washing, in sulphuric acid with subsequent addition of an alkali metal hydroxide to form a sulphate solution containing the cadmium and any magnesium which is present but to leave any lead, calcium or iron which is present substantially insoluble;
   (3) mixing the sulphate solution from step (2) with cadmium dust, followed by filtration, to remove any residual lead;
   (4) neutralizing the sulphate solution from step (3) with an alkali metal hydroxide to pH 7.5 to 9 to precipitate basic cadmium sulphate;
   (5) reacting the basic sulphate from step (4) with a solution of an alkali metal hydroxide, to yield cadmium hydroxide which is then filtered off, washed and dried.

2. A process as claimed in claim 1, where the precipitation of the carbonates of step (1) is carried out at a pH of about 8.8.

3. A process as claimed in claim 1, wherein the mixture of the mixed carbonates with sulphuric acid in step (2) has a pH of from 1.5 to 3.5.

4. A process as claimed in claim 1 wherein sufficient alkali metal hydroxide is added to the mixed carbonate-sulphuric acid mixture in step (2) to bring the pH to from 5.5 to 6.3.

5. A process as claimed in claim 1, wherein the sulphate solution from step (2) is treated, in step (3), with from 2 to 7 lbs. of cadmium dust per ton of cadmium sulphate in solution.

6. A process as claimed in claim 1, wherein the sulphate solution, after treatment with cadmium dust in step (3), is boiled with an amount of potassium permanganate in excess of that necessary to form manganese dioxide.

7. A process as claimed in claim 6, wherein the sulphate solution, after removal by filtration of any insoluble manganese dioxide present, is treated with sulphur dioxide gas to prevent formation of thallic salts.

8. A process as claimed in claim 1, wherein the cadmium sulphate solution treated in step (4) contains from 35 to 40 lbs. of cadmium sulphate per 100 gallons of solution.

References Cited

UNITED STATES PATENTS

| 1,552,595 | 9/1925 | Coolbaugh et al. | 23—117 |
| 1,644,431 | 10/1927 | Howard | 75—71 |
| 1,727,492 | 9/1929 | Teats | 23—183 |
| 3,248,212 | 4/1966 | Mellgren et al. | 75—71 X |

EDWARD J. MEROS, Primary Examiner.

U.S. Cl. X.R.

23—117